United States Patent [19]

Matsudaira

[11] Patent Number: 4,670,355

[45] Date of Patent: Jun. 2, 1987

[54] ELECTROLUMINESCENT PANEL COMPRISING A DIELECTRIC LAYER OF A MIXTURE OF TANTALUM OXIDE AND ALUMINUM OXIDE

[75] Inventor: Takeo Matsudaira, Tokyo, Japan

[73] Assignee: Hoya Corporation, Tokyo, Japan

[21] Appl. No.: 706,003

[22] Filed: Feb. 27, 1985

[30] Foreign Application Priority Data

Feb. 29, 1984 [JP] Japan .................................. 59-37765

[51] Int. Cl.[4] ........................ H05B 33/12; B32B 17/06

[52] U.S. Cl. .................................... 428/690; 428/691; 428/917; 313/503; 313/509

[58] Field of Search ................ 313/503, 509; 428/917, 428/690, 691

[56] References Cited

U.S. PATENT DOCUMENTS

| | | | |
|---|---|---|---|
| 3,274,024 | 9/1966 | Hill et al. | 313/509 X |
| 3,854,070 | 12/1974 | Ulasenko et al. | 313/509 X |
| 4,020,389 | 4/1977 | Dickson et al. | 313/509 X |
| 4,099,091 | 7/1978 | Yamazoe et al. | 313/509 |
| 4,188,565 | 2/1980 | Mizukami et al. | 313/509 |
| 4,357,557 | 11/1982 | Inohara et al. | 313/509 |
| 4,394,601 | 7/1983 | Takeda et al. | 313/509 |
| 4,416,933 | 11/1983 | Antson et al. | 313/503 X |
| 4,547,703 | 10/1985 | Fujita et al. | 428/690 X |

*Primary Examiner*—Nancy Swisher

*Attorney, Agent, or Firm*—Frishauf, Holtz, Goodman & Woodward

[57] ABSTRACT

In an electroluminescent panel comprising a first or transparent electrode, a second or back electrode, and an intermediate layer between the first and the second electrodes, a dielectric layer is included in the intermediate layer and comprises a mixture of tantalum oxide and aluminum oxide. The dielectric layer results from a target of tantalum pentoxide and aluminum oxide by the use of sputtering. Preferably, the target comprises the tantalum oxide and aluminum oxide in a ratio selected between 50:50 and 95:5 by weight. The dielectric layer may be divided into first and second dielectric films which underlies and overlies the electroluminescent layer, respectively. The electroluminescent layer may also be divided into first and second electroluminescent films with a transparent dielectric film interposed therebetween.

12 Claims, 7 Drawing Figures

ELECTROLUMINESCENT PANEL COMPRISING A DIELECTRIC LAYER OF A MIXTURE OF TANTALUM OXIDE AND ALUMINUM OXIDE

BACKGROUND OF THE INVENTION

This invention relates to an electroluminescent panel for use in displaying alphanumeric symbols, a static picture, a motion picture, and the like in an input/output device of a computer, and so on.

A conventional electroluminescent panel of the type described comprises a transparent substrate, a transparent or first electrode on the substrate, a back or second electrode opposite to the transparent electrode, and an intermediate layer between the first and the second electrodes. The intermediate layer comprises a dielectric layer and an electroluminescent layer of, for example, zinc sulfide (ZnS) which contains manganese (Mn).

With this structure, the electroluminescent panel is luminous in a yellowish orange color when an electric voltage is supplied between the first and the second electrodes. This is because electrons are excited to a conduction band by the electric field and are accelerated to activate luminescent centers of the manganese from a ground state. Such activated luminescent centers emit in the yellowish orange light when they return to the ground state.

The dielectric layer included in the intermediate layer serves to give a favorable value to the electric field developed in the electroluminescent layer. In addition, the dielectric layer is useful in raising the breakdown voltage of the electroluminescent panel.

Under the circumstances, it is preferable that the dielectric layer has a high dielectric strength, a high relative dielectric constant, a low dielectric loss, and a high moisture-proof capability. In addition, the dielectric layer should be in intimate contact with an adjacent layer.

Heretofore, yttrium oxide, aluminum oxide, silicon nitride, silicon oxynitride, tantalum pentoxide, lead titanate, barium titanate, and the like are used as materials of the dielectric layer. However, layers of the materials enumerated above have merits and demerits. More particularly, the yttrium oxide layer has a high relative electric constant between 10 and 15 and may therefore be convenient for, experimental use. However, the yttrium oxide layer has poor moisture-proof capability.

The aluminum oxide layer, the silicon nitride layer, and the silicon oxynitride layer have low relative dielectric constants, although they have enough high moisture-proof capabilities. Therefore, a high electric voltage should be given to the electroluminescent panel comprising either one of such layers.

The dielectric layer of either lead titanate or barium titanate is not only liable to be variable in composition but also low in dielectric strength because each of lead titanate and barium titanate is crystalline.

The tantalum pentoxide layer is favorably dense and has a high relative dielectric constant between 20 and 30, when deposited by sputtering. However, it has weak adhesion to the electroluminescent layer and the back electrode and is liable to peel off during manufacture of the electroluminescent panel and/or during operation thereof.

In order to avoid the above-mentioned defects, attempts have been directed to a composite intermediate layer comprising as the dielectric layer a plurality of dielectric films which are different in composition from one another. However, an electroluminescent panel of this type is disadvantageous because of insufficient adhesion between two adjacent layers and serious dielectric loss. In addition, deposition of such a composite intermediate layer is very troublesome.

SUMMARY OF THE INVENTION

It is an object of this invention to provide an electroluminescent panel which has excellent characteristics.

It is another object of this invention to provide an electroluminescent panel of the type described, which has a high moisture-proof capability, a high dielectric strength, and a good adhesion.

It is still another object of this invention to provide an electroluminescent panel of the type described, which has a long lifetime.

According to this invention, an electroluminescent panel comprises a first electrode which is transparent, a second electrode which is opposite to the first electrode, and an intermediate layer interposed between the first and the second electrodes. The intermediate layer comprises an electroluminescent layer luminescent in a preselected color and a dielectric layer which is brought into contact with the electroluminescent layer and/or the second electrode and which comprises a mixture of tantalum oxide and aluminum oxide.

DESCRIPTION OF THE PREFERRED EMBODIMENTS

Figure 1:
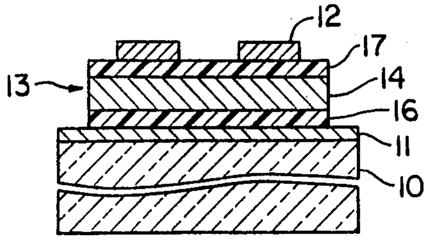
FIG. 1 is a sectional view of an electroluminescent panel according to a first embodiment of this invention.

Referring to FIG. 1, an electroluminescent panel according to a first embodiment of this invention comprises a transparent substrate 10 of aluminosilicate glass which may be, for example, NA-40 manufactured and sold by HOYA Corporation, Tokyo, Japan. The substrate 10 has a principal surface which is directed upwards of FIG. 1 and which is covered with a transparent or first electrode 11. The first electrode 11 consists of a plurality of transparent conductors of, for example, indium tin oxide (abbreviated to ITO). Each of the first transparent conductors is separated from one another and is extended from a right-hand side of FIG. 1 to a left-hand side thereof.

A second or back electrode 12 is opposite to the first electrode 11 and consists of a plurality of second conductors of, for example, aluminum. The second conductors are orthogonal to and isolated from the first conductors.

An intermediate layer 13 is interposed between the first and the second electrodes 11 and 12 and comprises an electroluminescent layer 14 and a dielectric layer. The illustrated dielectric layer comprises a first dielectric film 16 between the first electrode 11 and the electroluminescent layer 14 and a second dielectric film 17 between the electroluminescent layer 14 and the second electrode 12. Each of the first and the second dielectric films 16 and 17 comprises a mixture of tantalum oxide ($Ta_xO_y$) and aluminum oxide ($Al_uO_v$) and is deposited in a manner to be described later.

The illustrated electroluminescent layer 14 comprises zinc sulfide (ZnS) and manganese (Mn) which serve as a base material and an activator, respectively. The electroluminescent layer 14 is deposited in the manner which will be also described later.

With this structure, the electroluminescent layer 14 is activated by an a.c. voltage $V_0$ applied to the first and the second electrodes 11 and 12 and is luminous in a yellowish orange color. Luminescence of the electroluminescent layer 14 is visible through the first electrode 11 and the transparent substrate 10 in a manner similar to that of a conventional electroluminescent panel.

During manufacture of the illustrated electroluminescent panel, the first electrode 11 is deposited to a thickness of, for example, 2,000 angstroms by the use of a d.c. sputtering technique. The sputtering is carried out with partial pressures of oxygen and argon gases kept at $2\times10^{-4}$ Torr and $8\times10^{-4}$ Torr, respectively, at a substrate temperature of 200° C. and with an electric current for the sputtering kept equal to 1.5 milliamperes/cm$^2$.

On the first electrode 11, the first dielectric film 16 is deposited to a thickness of, for example, 3,000 angstroms by rf (radio frequency) sputtering. More specifically, a target is prepared by mixing powdered tantalum pentoxide ($Ta_2O_5$) and powdered aluminum oxide ($Al_2O_3$) in a ratio of 80:20 by weight and by pressing and sintering the mixture. Subsequently, the above-mentioned sputtering is carried out by the use of the target in an atmosphere of an argon gas kept at a total pressure of $5\times10^{-3}$ Torr. A partial pressure of oxygen gas is equal to 20% of the total pressure. In addition, the substrate 10 is kept at 200° C. during the sputtering.

At any rate, it has been found that the first dielectric film 16 is an amorphous film of the mixture of tantalum oxide ($Ta_xO_y$) and aluminum oxide ($Al_uO_v$).

Subsequently, the first dielectric film 16 is covered with the electroluminescent layer 14 formed by vacuum evaporation. In this event, the evaporation source of ZnS:Mn pellets is obtained by adding 0.5% of manganese powder by weight to zinc sulfide powder and by pressing and sintering the mixture. The ZnS:Mn luminance layer with the thickness of 5,000 angstroms is deposited at a substrate temperature of 200° C.

After the deposition of the electroluminescent layer 14, the second dielectric film 17 is deposited to a thickness of 3,000 angstroms by the use of the same target and method as those described in conjunction with the first dielectric film 16. As a result, the second dielectric film 17 is an amorphous film comprising tantalum oxide ($Ta_xO_y$) and aluminum oxide ($Al_uO_v$).

Thereafter, an aluminum layer is deposited on the second dielectric film 17 by the use of vacuum evaporation in a known manner and is stripped into the second electrode 12 in the manner known in the art.

The first and the second dielectric films 16 and 17 are dense and tenaciously adhere to the electroluminescent layer 14 and the first and the second electrodes 11 and 12 because they are amorphous. Therefore, it is possible to prevent all of the layers and the films from peeling off one another.

Figure 2:
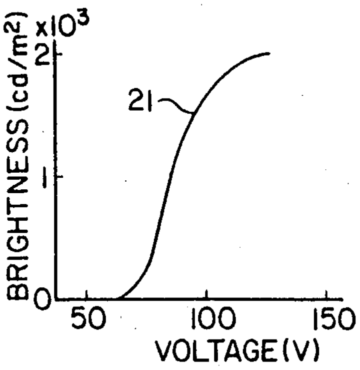
FIG. 2 is a graphical representation of a characteristic of the electroluminescent panel illustrated in FIG. 1.

Temporarily referring to FIG. 2, wherein the abscissa and the ordinate represent an a.c. voltage (V) of a frequency of 1 kHz and brightness (cd/m$^2$), respectively, a curve 21 shows a characteristic of the electroluminescent panel illustrated in FIG. 1. As readily understood from the curve 21, the electroluminescent panel exhibits a high brightness at a low voltage, such as 100 V, and may therefore be driven by the low a.c. voltage. This is because each of the first and the second dielectric films 16 and 17 exhibits a high relative dielectric constant between 21 and 24 at the frequency of 1 kHz.

In FIG. 1, each of the first and the second dielectric films 16 and 17 has a high moisture-proof capability and a high chemical resistance. This means that the second dielectric film 17 is not etched by an etchant on forming the second electrode 12. It is therefore possible to avoid undesired immersion of the etchant into the electroluminescent layer 14 and unfavorable breakage of insulation resulting from the immersion of etchant.

It is preferable that each of the first and the second dielectric films 16 and 17 has a thickness between 1,000 angstroms and 5,000 angstroms, respectively, both inclusive. When the thickness becomes thinner than 1,000 angstroms, pinholes are liable to occur in each dielectric film 16 or 17. The dielectric strength is likely reduced in each dielectric film 16 or 17. When the thickness exceeds 5,000 angstroms, the electroluminescent panel must be driven by a high voltage. In addition, it takes a long time to manufacture the electroluminescent panel.

Consideration is directed to the ratio of tantalum pentoxide and aluminum oxide both of which are included in the target for use in manufacturing the first and the second dielectric films 16 and 17. Table 1 shows relationships between the ratios and dielectric characteristics as regards first through fifth samples.

TABLE 1

| | Mixing Ratio of $Ta_2O_5$:$Al_2O_3$ (% by weight) | Relative Dielectric Constant ($\epsilon/\epsilon_0$) | Dielectric Loss (tan $\delta$) | Dielectric Strength ($\times 10^6$ V/cm) |
|---|---|---|---|---|
| First Sample | 100:0 | 25~28 | 0.01~0.03 | 1.5~2 |
| Second Sample | 95:5 | 22~26 | 0.005~0.01 | 2~4 |
| Third Sample | 80:20 | 21~24 | 0.001~0.005 | 3~5 |
| Fourth Sample | 50:50 | 13~16 | 0.001~0.005 | 4~5 |
| Fifth Sample | 0:100 | 7~8 | 0.001~0.005 | 4~6 |

As will readily be understood from Table 1, the dielectric loss becomes large and the dielectric strength becomes weak when the aluminum oxide becomes less than 5% by weight. Detachment or peeling off is likely to occur between two adjacent layers. Addition of more than 50% of aluminum oxide results in a reduction of the relative dielectric constant. As a result, the target should preferably comprise the tantalum pentoxide and aluminum oxide in a ratio selected between 50:50 and 95:5 by weight.

Although the above-mentioned target is prepared from the mixture of powdered tantalum oxide and powdered aluminum oxide, the target may be a combination of a sintered tantalum oxide body and a sintered aluminum oxide body which is superposed on the sintered tantalum oxide body. With the target of this combination type, it is possible to adjust the ratio between the tantalum pentoxide and aluminum oxide to a range between 50:50 and 95:5 by weight, by varying sizes of the bodies and positions thereof.

In the magnetron sputtering system, a tantalum pentoxide target may be spatially separated from an aluminum oxide target so that the ratio falls within the above-mentioned range by adjusting areas of the tantalum pentoxide target and the aluminum oxide target.

On depositing the first and the second dielectric films 16 and 17, rf non-magnetron sputtering may be carried out in lieu of the rf magnetron sputtering. Table 2 shows desired conditions of production of each sputtering.

TABLE 2

| | Magnetron Sputtering | Non-Magnetron Sputtering |
|---|---|---|
| Total Pressure (Torr) | $1 \times 10^{-3} \sim 1 \times 10^{-2}$ | $5 \times 10^{-3} \sim 5 \times 10^{-2}$ |
| Partial Pressure of Oxygen | 5 ~50% of the total pressure | 5~50% of the total pressure |
| Deposition Rate (Å/min) | 10~100 | 10~50 |
| Substrate Temperature (°C.) | 30~300 | 30~300 |

According to the inventor's experimental studies, it has been found out that each of the first and the second dielectric films 16 and 17 is excellent and stable in the dielectric characteristics listed in Table 1 and in adhesion and the like when deposited under the above-mentioned desired conditions. In order to raise the deposition rate in consideration of mass productivity of the electroluminescent panels, the partial pressure of oxygen may be increased within a range listed in Table 2 so as to obtain desirable dielectric films. Instead of the above-mentioned sputtering methods, use is possible of a sputtering method such that a thermionic electron emission source and/or an extra electrode may be disposed in a hollow space defined by a chamber. In this event, the desired conditions listed in Table 2 might be varied somewhat.

Figure 3:
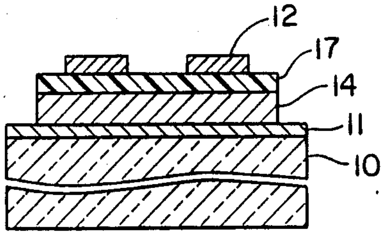
FIG. 3 is a sectional view of an electroluminescent panel according to a second embodiment of this invention.

Referring to FIG. 3, an electroluminescent panel according to a second embodiment of this invention is similar to that illustrated in FIG. 1 except that the first dielectric film 16 (FIG. 1) is removed from the electroluminescent panel being illustrated. Therefore, the illustrated electroluminescent panel comprises a single dielectric layer which is equivalent to the second dielectric film 17 and therefore depicted at 17. The illustrated dielectric layer 17 is brought into contact with the second electrode 12 and comprises a composition similar to the first and the second dielectric films 16 and 17 illustrated in FIG. 1. In addition, the dielectric layer 17 is manufactured in the same manner as the first and the second dielectric films 16 and 17.

Inasmuch as the first dielectric film 16 is removed from FIG. 3, the electroluminescent layer 14 is in direct contact with the first electrode 11.

Figure 4:
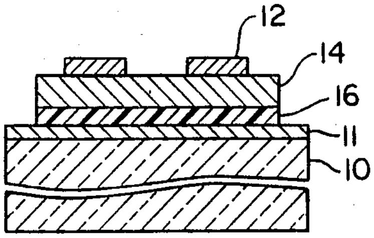
FIG. 4 is a similar view of an electroluminescent panel according to a third embodiment of this invention.

Referring to FIG. 4, an electroluminescent panel according to a third embodiment of this invention is similar to that illustrated in FIG. 1 except that a single dielectric layer alone is included in the electroluminescent panel of FIG. 4 with the second dielectric film 17 (FIG. 1) removed therefrom. Therefore, the single dielectric layer is equivalent to the first dielectric film 16 (FIG. 1) and is therefore depicted at 16 in FIG. 4. In this connection, the electroluminescent layer 14 is brought into direct contact with the second electrode 12.

Figure 5:
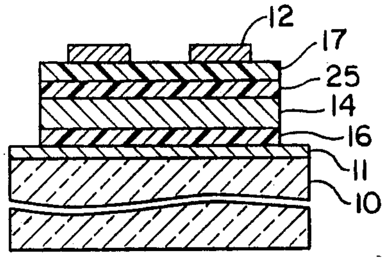
FIG. 5 is a similar view of an electroluminescent panel according to a fourth embodiment of this invention.

Referring to FIG. 5, an electroluminescent panel according to a fourth embodiment of this invention is similar to that illustrated in FIG. 1 except that a light absorption layer 25 is laid between the electroluminescent layer 14 and the second dielectric film 17. The light absorption layer 25 may comprise cadmium telluride (CdTe) and the like. It will be needless to say that the first and the second partial dielectric films 16 and 17 are manufactured in the same manner as those illustrated in FIG. 1 by the use of the same target.

Figure 6:
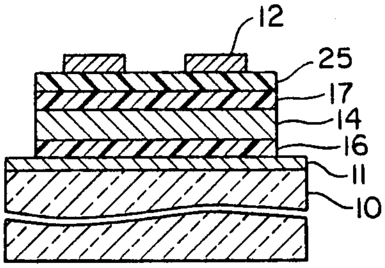
FIG. 6 is a similar view of an electroluminescent panel according to a fifth embodiment of this invention.

Referring to FIG. 6, an electroluminescent panel according to a fifth embodiment of this invention is similar to that illustrated in FIG. 5 except that the light absorption layer 25 and the second dielectric film 17 are upset relative to those shown in FIG. 5. As a result, the light absorption layer 25 overlies the second dielectric film 17 and underlies the second electrode 12.

Figure 7:
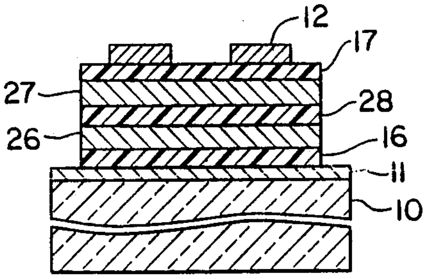
FIG. 7 is a similar view of an electroluminescent panel according to a sixth embodiment of this invention.

Referring to FIG. 7, an electroluminescent panel according to a sixth embodiment of this invention comprises similar parts designated by like reference numerals. In FIG. 7, the electroluminescent layer 14 comprises a first electroluminescent film 26 in contact with the first dielectric film 16, a second electroluminescent film 27 in contact with the second dielectric film 17, and a transparent dielectric film 28 between the first and the second electroluminescent films 26 and 27. The first electroluminescent film 26 may be, for example, a zinc sulfide film (ZnS) containing terbium trifluoride ($TbF_3$) while the second electroluminescent film 27 may be, for example, a zinc sulfide film (ZnS) containing samarium trifluoride ($SmF_3$). The transparent dielectric film 28 may be of yttrium oxide ($Y_2O_3$), tantalum pentoxide ($Ta_2O_5$), titanium dioxide ($TiO_2$), aluminum oxide ($Al_2O_3$), silicon nitride ($Si_3N_4$), silicon dioxide ($SiO_2$), or the like.

In the above-mentioned example, the first electroluminescent film 26 is luminous in a green color while the second electroluminescent film 27, in a red color. Accordingly, luminescence of the panel appears in an intermediate hue between green and red.

The first electroluminescent film 26 may be identical in composition with the second electroluminescent film 27.

While this invention has thus far been described in conjunction with several embodiments thereof, it will readily be possible for those skilled in the art to put this invention into practice in various other manners. For example, each electroluminescent panel may be either coated with a protection layer, such as a dielectric layer, an organic resin layer, or the like, having a high moisture-proof capability or with a protection cover of glass or the like. The protection layer or the protection cover should leave contact portions uncovered for the first and the second electrodes 11 and 12. The transparent substrate 10 may be, for example, of soda-lime glass, quartz, or the like. The first or transparent electrode 11 may be of indium oxide ($In_2O_3$), a combination of indium oxide and tungsten (W), or stannic oxide ($SnO_2$) which contains antimony and fluorine. As regards the electroluminescent layer 14, the base material may be zinc selenide (ZnSe) or a compound of zinc sulfide (ZnS) and zinc selenide (ZnSe). The activator may be selected from a group of manganese, copper, aluminum, rare earth elements, halogens, and the like. For example, addition of copper or aluminum to zinc sulfide gives a yellowish green color while addition of copper or bromine to zinc sulfide or zinc selenide provides a green color. Furthermore, addition of samarium, terbium, and thulium to zinc sulfide gives red, green, and blue colors, respectively. Finally, the second electrode may comprise a metal selected from a group of tantalum, molybdenum, iron, nickel, nickel-chrome, and so on.

What is claimed is:

1. An electroluminescent panel comprising a first electrode which is transparent, a second electrode which is opposite to said first electrode, and an intermediate layer between said first and said second electrodes, said intermediate layer comprising:

an electroluminescent layer luminous in a preselected color; and a dielectric layer adjacent to at least one of said first and second electrodes and comprising a mixture of tantalum oxide and aluminum oxide, said dielectric layer being formed by a selected one of magnetron sputtering and non-magnetron sputtering using a target comprising said tantalum oxide and said aluminum oxide in a ratio from 50:50 to 95:5 by weight.

2. The electroluminescent panel of claim 1, wherein said target is manufactured by mixing powder of said tantalum oxide with powder of said aluminum oxide in said ratio into mixed powder and by pressing and sintering said mixed powder to form said target.

3. The electroluminescent panel of claim 2, wherein said tantalum oxide is tantalum pentoxide.

4. The electroluminescent panel of claim 1, wherein said target is a combination of a sintered tantalum oxide body and a sintered aluminum oxide body having an overall ratio of tantalum oxide to aluminum oxide within said ratio.

5. The electroluminescent panel of claim 1, wherein said selected sputtering is carried out in an oxygen atmosphere.

6. The electroluminescent panel of claim 1, wherein said dielectric layer is positioned closer to said first electrode than is said electroluminescent layer.

7. The electroluminescent panel of claim 1, wherein said dielectric layer is positioned closer to said second electrode than is said electroluminescent layer.

8. The electroluminescent panel of claim 1, wherein said dielectric layer comprises:

a first dielectric film of said mixture close to said first electrode; and a second dielectric film of said mixture which is positioned farther from said first electrode than is said first amorphous dielectric film;

said electroluminescent layer being interposed between said first and said second dielectric films.

9. The electroluminescent panel of claim 1, wherein said dielectric layer comprises:

a first dielectric film of said mixture interposed between said first electrode and said electroluminescent layer; and a second dielectric film of said mixture overlying said electroluminescent layer;

said electroluminescent panel further comprising:

a light absorption layer between said second dielectric film and said second electrode.

10. The electroluminescent panel of claim 1, wherein said dielectric layer comprises:

a first dielectric film of said mixture between said first electrode and said electroluminescent layer; and a second dielectric film of said mixture closer to said second electrode than said first dielectric film;

said electroluminescent panel further comprising:

a light absorption layer between said electroluminescent layer and said second dielectric film.

11. The electroluminescent panel of claim 1, wherein said dielectric layer comprises:

a first dielectric film of said mixture adjacent to said first electrode; and a second dielectric film of said mixture closer to said second electrode than said first dielectric film;

said electroluminescent layer comprising:

a first electroluminescent film adjacent to said first dielectric film;

a second electroluminescent film which is closer to said second electrode than said first electroluminescent film; and a transparent dielectric film laid between said first and said second electroluminescent films.

12. The electroluminescent panel of claim 1, wherein said dielectric layer is amorphous.

* * * * *